United States Patent [19]

Vaughnn

[11] Patent Number: 5,760,974

[45] Date of Patent: Jun. 2, 1998

[54] LENS SYSTEM FOR MAXIMIZING LIGHT COLLECTION EFFICIENCY AND TRANSMISSION

[75] Inventor: David Vaughnn, Tucson, Ariz.

[73] Assignee: Photometrics, Ltd., Tucson, Ariz.

[21] Appl. No.: 802,443

[22] Filed: Feb. 18, 1997

[51] Int. Cl.$^6$ ............................... G02B 9/62; G02B 3/00
[52] U.S. Cl. ........................ 359/756; 359/722; 359/723
[58] Field of Search ............................... 359/756, 662, 359/722, 723, 679; 250/208.1, 226; 378/98.3, 98.8; 348/294

[56] References Cited

U.S. PATENT DOCUMENTS

| | | | |
|---|---|---|---|
| 5,142,557 | 8/1992 | Toker et al. | 378/98 |
| 5,465,284 | 11/1995 | Karellas | 378/98.9 |
| 5,692,507 | 12/1997 | Seppi et al. | 378/98.8 |

Primary Examiner—Georgia Y. Epps
Assistant Examiner—Jordan M. Schwartz
Attorney, Agent, or Firm—Herbert M. Shapiro

[57] ABSTRACT

An optical lens system includes a multi-element lens designed to maximize light collection efficiency and transmission but accepting a sufficiently high level of distortion to forego the system from imaging light patterns at each of a set of wavelengths at which the patterns are being emitted from a planar source simultaneously. The system also illustratively includes a cooled CCD camera with a dewar and filter assembly which is movable along the optic axis of the system to specified positions for selecting a particular wavelength at which an image is in focus so that the light pattern (image) at each different wavelength can be captured at a different time. A CCD camera is used to capture the image and the camera controller includes software to reduce the amount of distortion introduced by the lens. The light transmission of the system is essentially double that of prior art systems and is particularly useful for electropheresis applications where data is gathered at discrete wavelengths and is also useful for X-ray applications.

8 Claims, 9 Drawing Sheets

LENS SYSTEM FOR MAXIMIZING LIGHT COLLECTION EFFICIENCY AND TRANSMISSION

FIELD OF THE INVENTION

This invention relates to optical systems and more particularly to such a system designed for maximum light collection efficiency and transmission.

BACKGROUND OF THE INVENTION

Prior art optical systems are constrained by design requirements which are directed at minimizing distortion and permitting simultaneous focusing at all wavelengths. Although these requirements are primarily for the photographic industry, they represent the conventional wisdom for essentially all image capturing systems. The problem with the resulting optical systems is that they are generally inefficient light capturers. The prior art systems address the poor light capturing capability by employing increasingly larger and/or complex lens systems lenses. But, these are prohibitively expensive for most commercial applications.

BRIEF DESCRIPTION OF THE INVENTION

The invention is based on the recognition that there are some applications where maximum light collection and transmission are more important than distortion correction and multiple wavelength focusing. Further, it has been recognized that software systems exist in the field of astronomy for reducing distortion. Although such software systems are used for reflective, infinite conjugate systems characteristic of lens and mirror systems used in astronomy, a refractive, finite conjugate lens system, in accordance with the principles of this invention, is purposely designed to accept distortion, significantly higher than distortion levels acceptable in prior art optical systems, and to adapt the distortion-correcting software from the field of astronomy to remove the distortion. In the absence of a constraint of a minimum distortion requirement, a design for maximum light collection efficiency and transmission is achievable. This trade off can be taken advantage of further by relaxing requirements to focus at multiple wavelengths simultaneously. In this case, the routines for removing distortion are modified (augmented) by accomodating a change in lateral magnification. In this connection, "distortion" is defined as a radially symmetrical, unabberated, field-dependent change in lateral magnification. Thus, a system in accordance with the principles of this invention also includes a CCD camera with a filter and a dewar assembly and means for moving the entire assembly to different positions along the optic axis of the optical system to one of a set of positions at which an image, or light pattern, is in focus for acquiring light images at that wavelength. The system is particularly useful in electropheresis apparatus where light is collected at only discrete wavelengths and in X-ray systems where X-rays strike a phosphor which emits visible light.

DETAILED DESCRIPTION OF AN ILLUSTRATIVE EMBODIMENT OF THIS INVENTION

Figure 1:
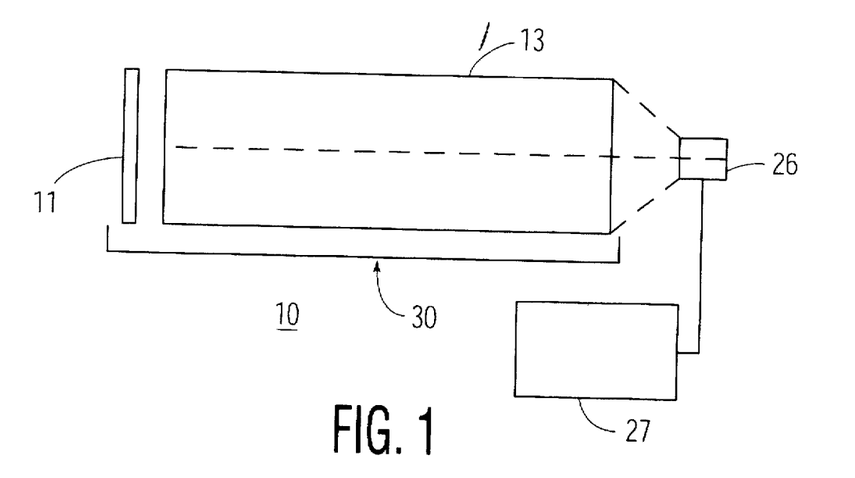
FIG. 1 is a schematic representation of an optical system in accordance with the principles of this invention.

FIG. 1 shows a refractive optical system 10, in accordance with the principles of this invention, used to acquire light emitted from a light emitting source such as a square gel electropheresis object target 11. The system includes an optical lens system 13 with the elements designated 15, 16, 17, 18, 19, and 20 from left to right as viewed in FIG. 2. The system also includes a filter 22, a dewar window 24 and a solid state camera such as cooled CCD camera 26. Camera 26 is connected to a controller 27 which contains a memory for storing images captured by camera 26 and also contains software for correcting any distortion introduced by the optical system.

Figure 2:
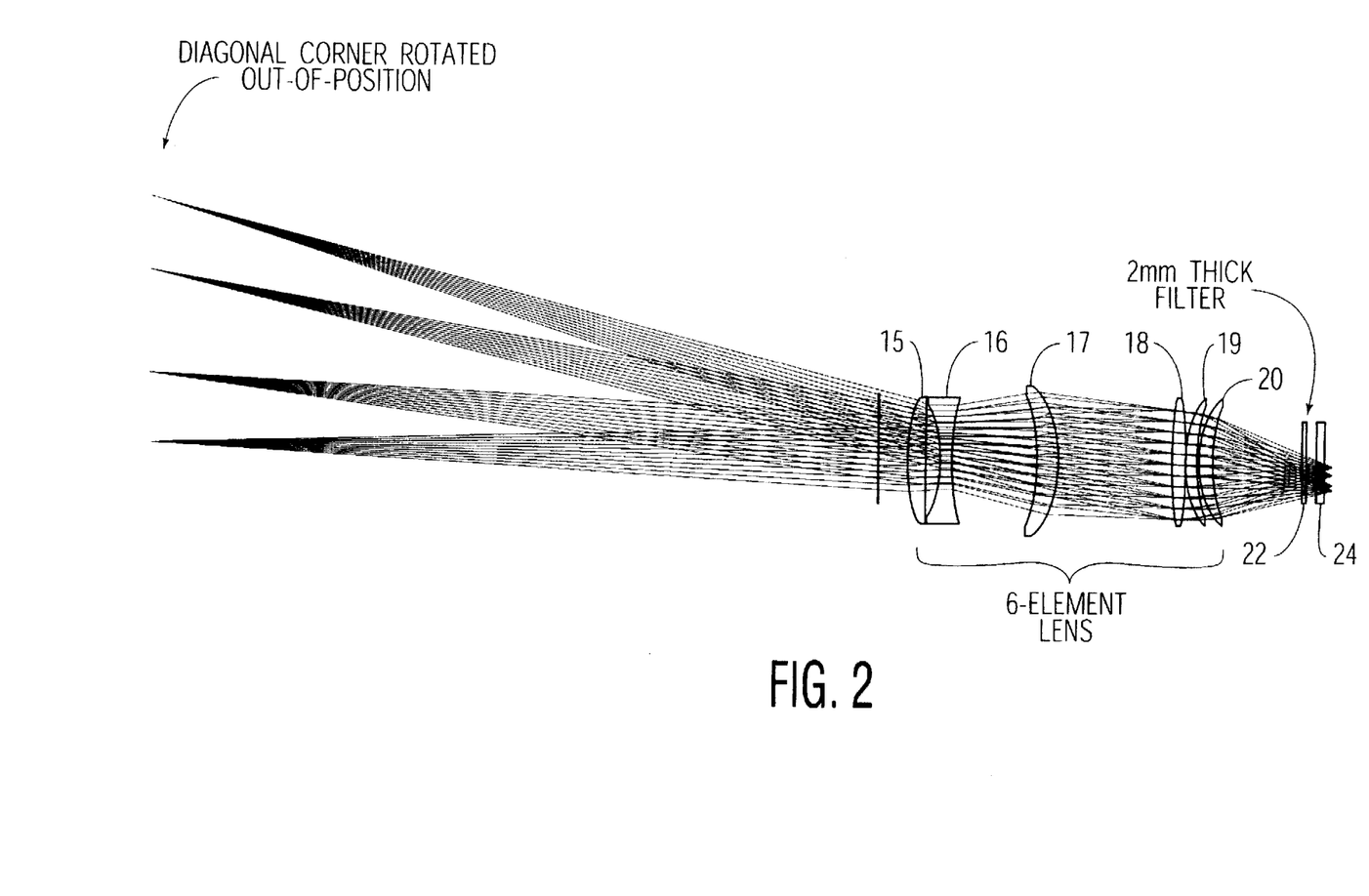
FIG. 2 is an enlarged representation of the lens configuration for the optical system of FIG. 1.
Figure 3:
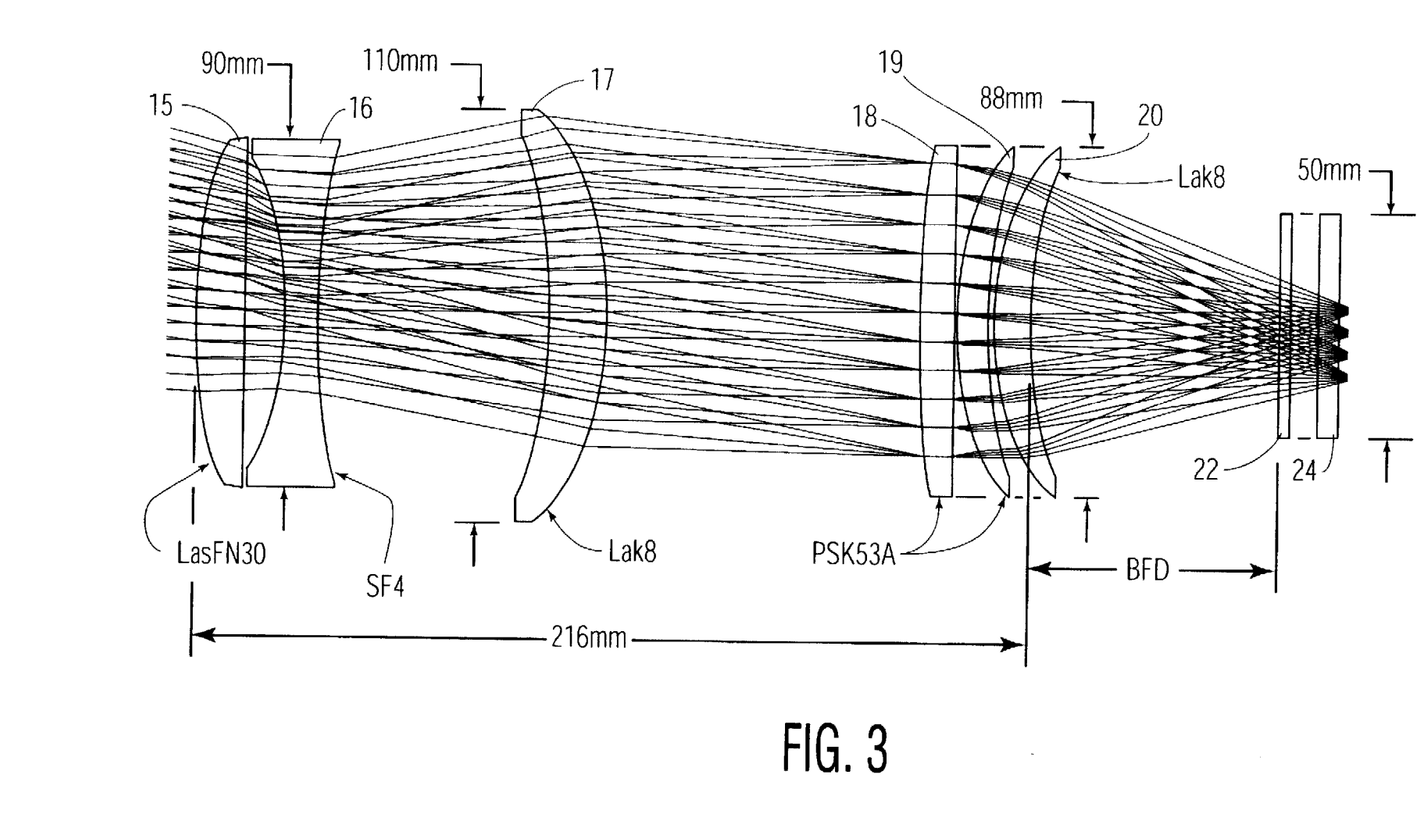
FIGS. 3–8 are plots of the RMS spot size across the entire field of the system of FIGS. 1 and 2.
Figure 4:
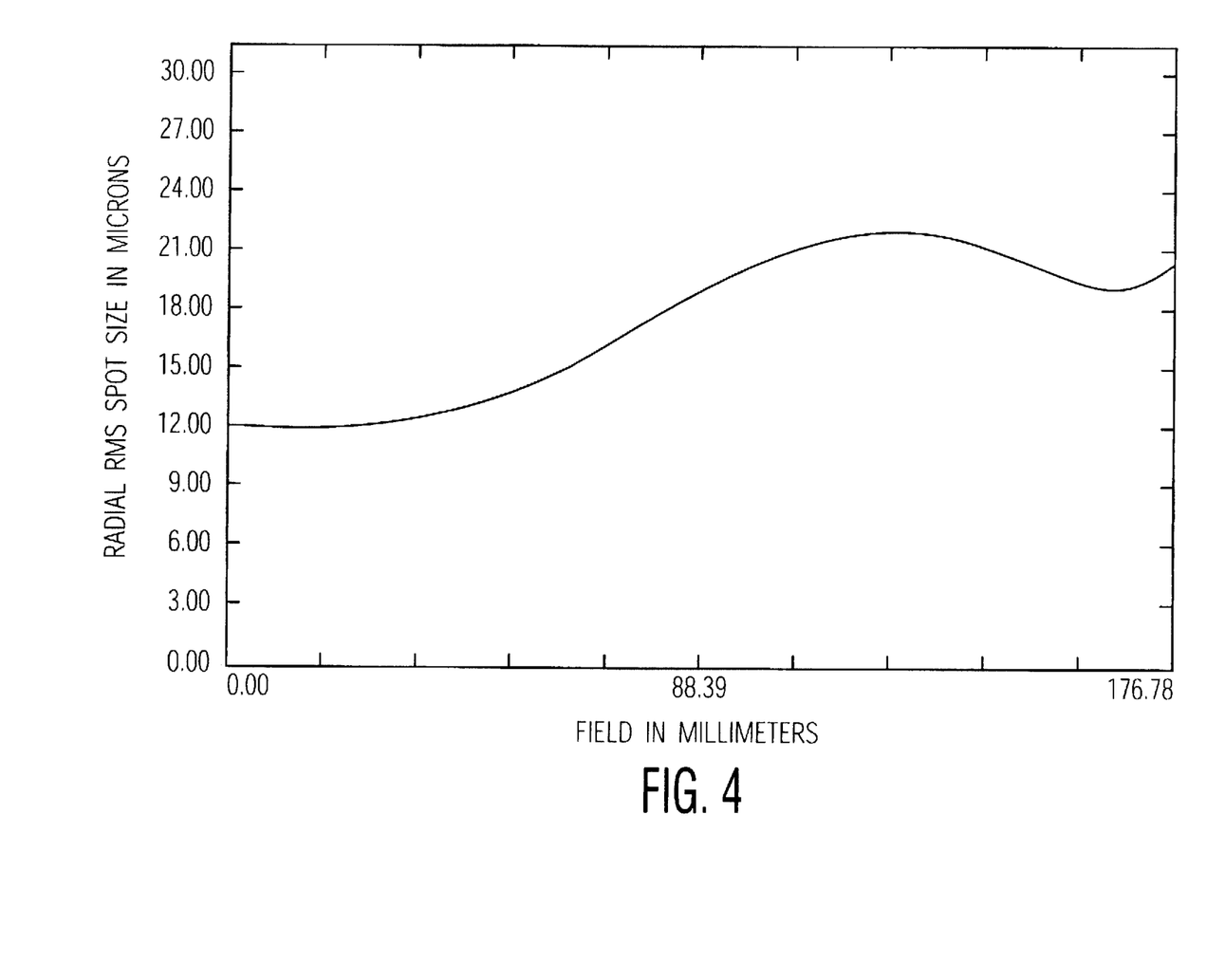
Figure 5:
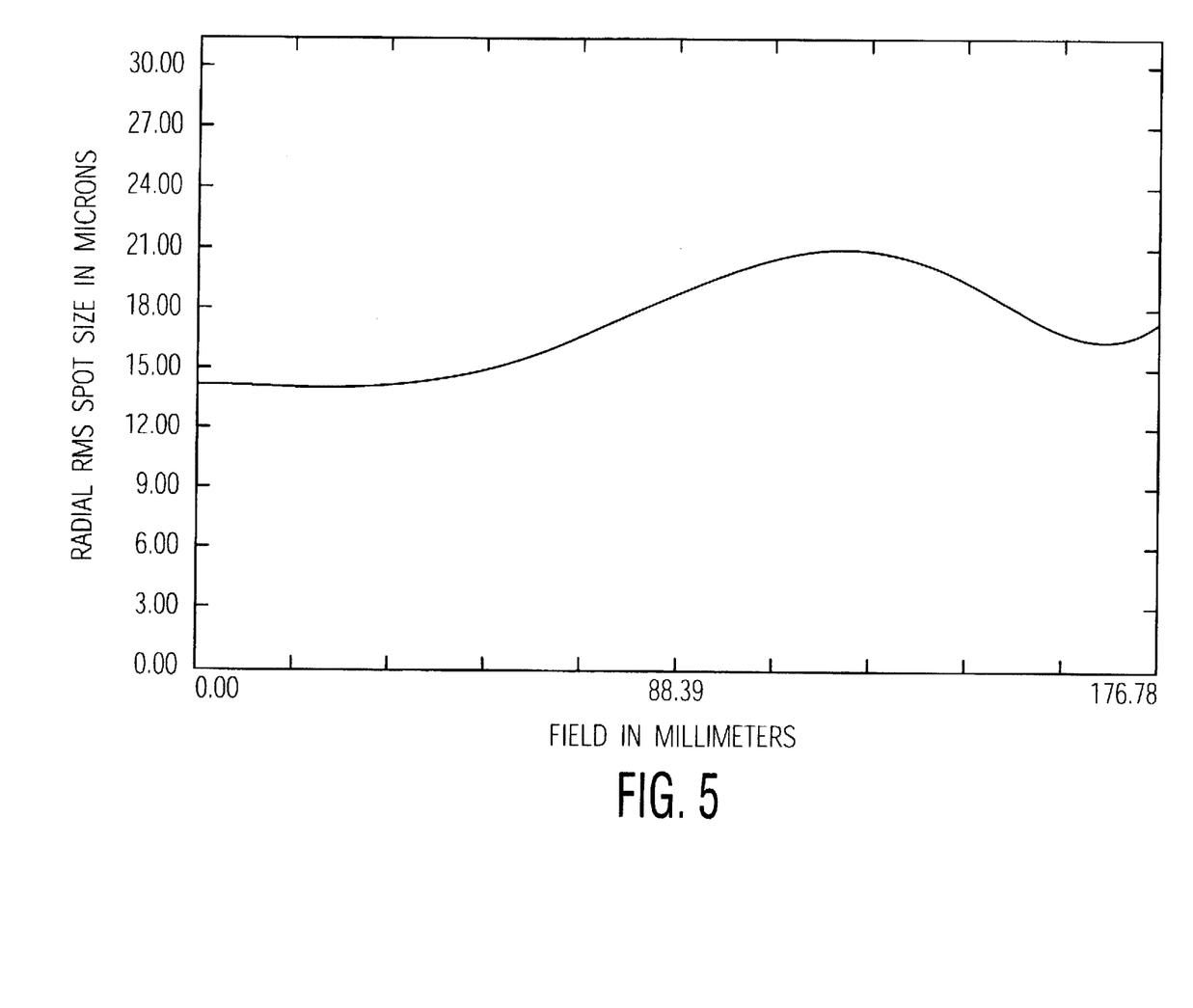
Figure 6:
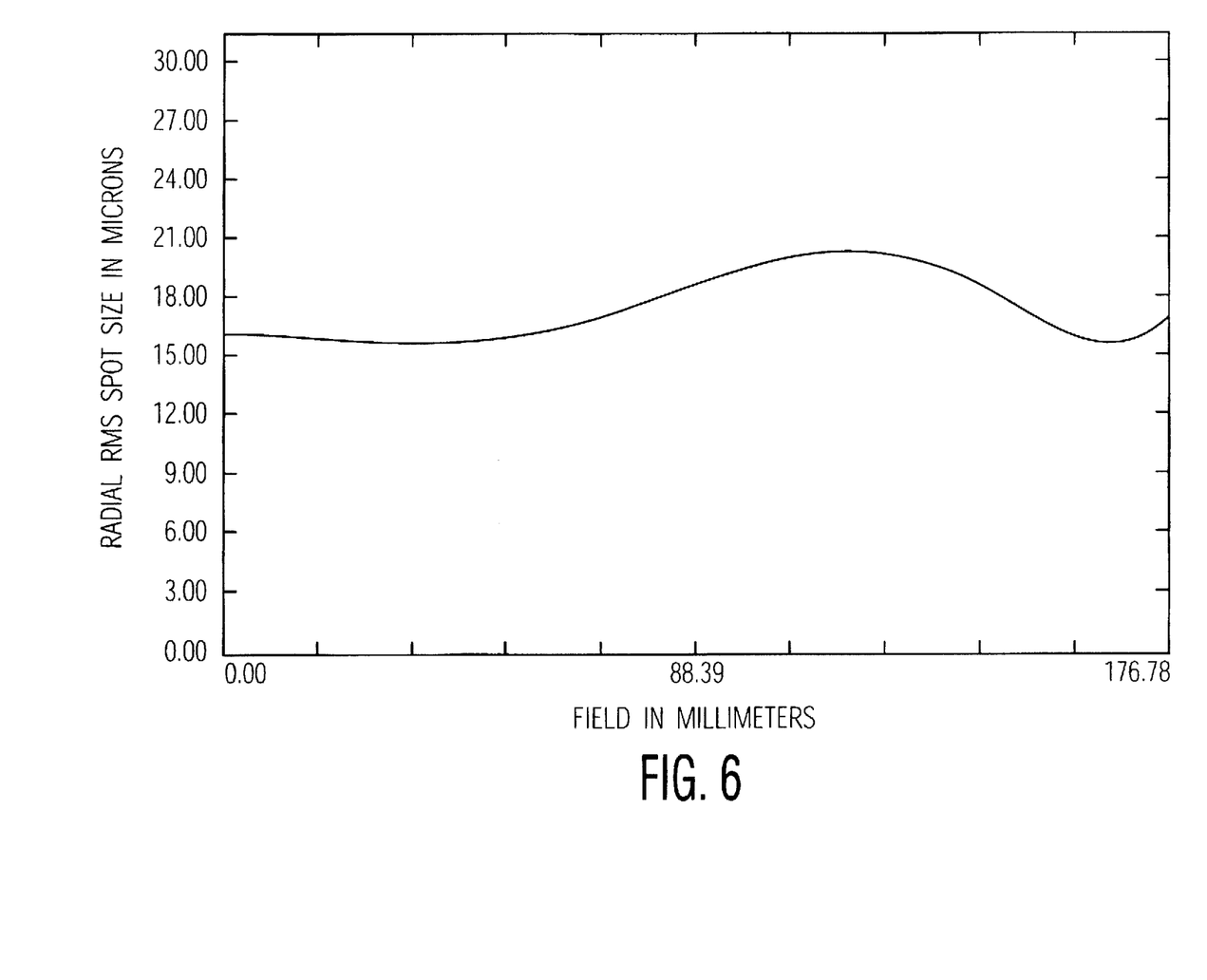
Figure 7:
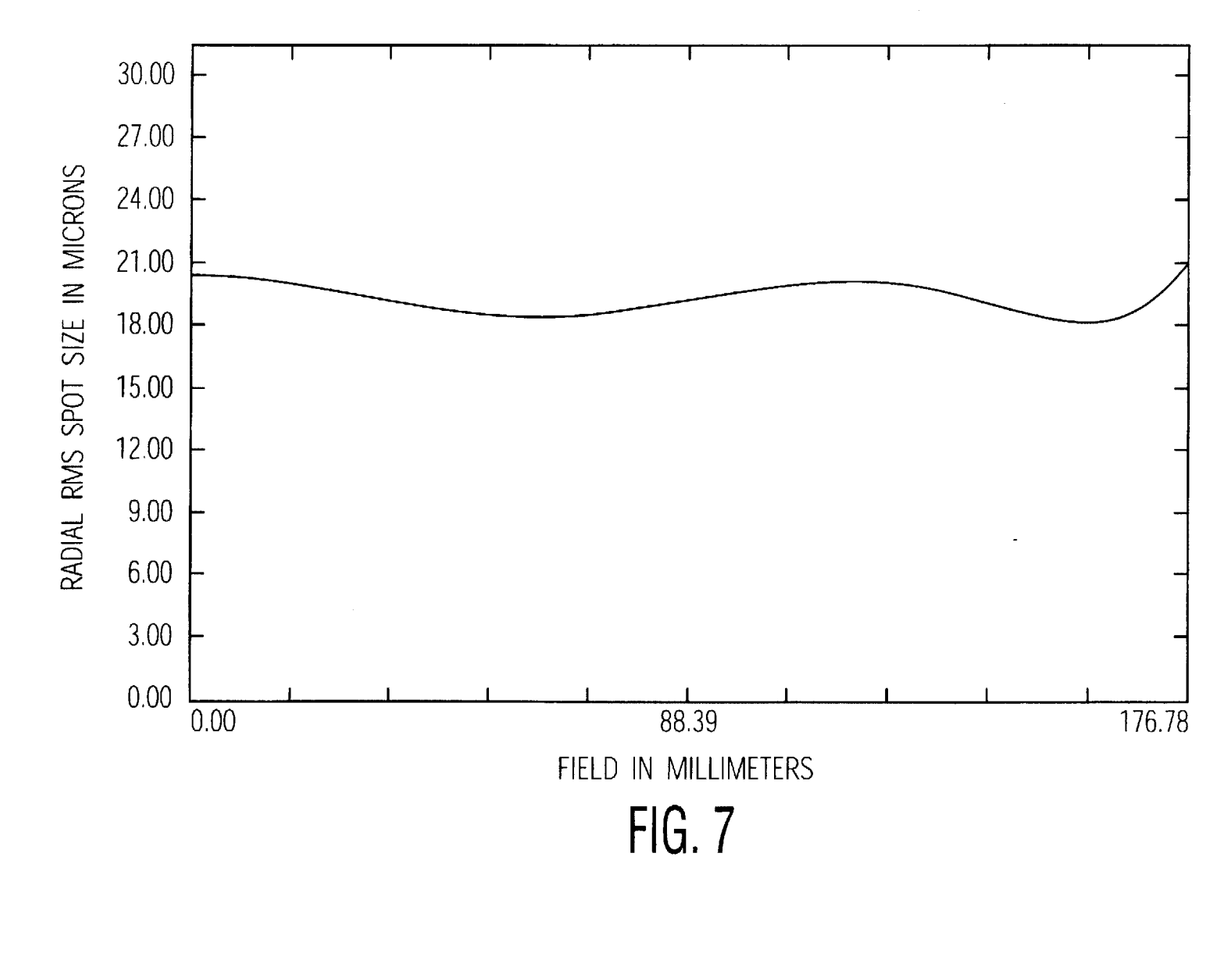
Figure 8:
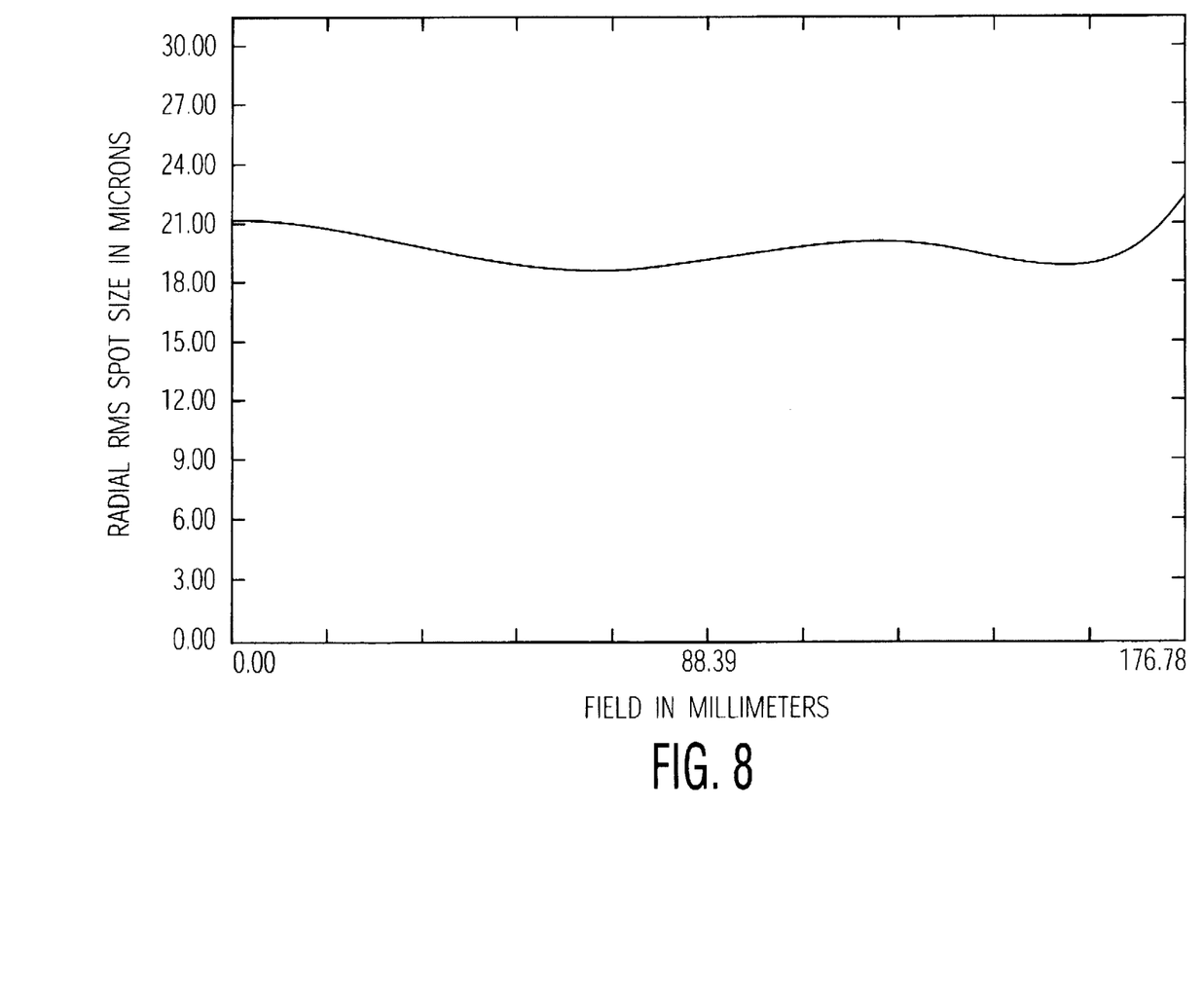

The six element lens is designed, illustratively, as a high numerical aperture, finite-conjugate imaging lens designed to capture as much light as possible from an illustrative twenty five centimeter square gel electropheresis target and to image onto a twenty four micron square pixel, one thousand and twenty four square pixel CCD. It is designed to work over a wavelength range from 390 nm to 595 nm, though separately at individual wavelengths. The RMS spot size across the entire field is on the order of the pixel sampling rate.

This design uniquely utilizes four preferred Shott glasses which transmit well at the difficult UV wavelength of 390 nm. Assuming one percent loss due to reflections at this wavelength, the overall efficiency is sixty six percent. This is double (or better) the efficiency of a typical 35 mm commercially available lens in the center of the field and four times (or better) in the corners of the field.

The numerical aperture of the source is 0.042. This corresponds to collecting 0.088 percent of the total source radiance (Lambertion assumption). This is far better than a commercially available f/1.0 camera lens stopped down one or more stops to achieve good imagery (low aberation). The lens is characterized by some off-axis pupil forshortening but there is no vignetting at all.

The distance between the target and the lens is maintained constant by a fixed platform indicated at 30 in FIG. 1. That distance, in the illustrative embodiment, is 527 nm and the six elements of the lens occupies 216 nm in the illustrative embodiment. Focusing for different wavelength regions is done by translating the filter (plus the shutter) and dewar window assembly relative to the lens. The back focal distance increases by 2.05 nm from 390 nm to 595 nm. The illustrative system is designed to work with a standard commercialy available filter with a lateral diameter of 50 mm and a thickness of 2 mm.

TABLE 1 lists the design parameters for the lens of FIG. 2 for the illustrative embodiment:

TABLE 1

| | |
|---|---|
| Surfaces | 18 |
| Stop | 8 |
| System Aperture | Object Space N.A. |
| Ray aiming | On |
| Apodization | Uniform, factor = 0.000000 |
| Eff. Focal Len. | 68.0643 (in air) |
| Eff. Focal Len. | 68.0643 (in image space) |
| Total Track | 321.764 |
| Image Space F/# | 1.19853 |
| Para. Wrkng F/# | 1.29413 |
| Working F/# | 1.29631 |
| Obj. Space N.A. | 0.042 |
| Stop Radius | 38.4577 |
| Parax. Ima. Hgt. | 19.2342 |
| Parax. Mag. | −0.108803 |
| Entr. Pup. Dia. | 56.7899 |
| Entr. Pup. Pos. | 148.339 |
| Exit Pupil Dia. | 77.4646 |
| Exit Pupil Pos. | −100.084 |
| Field Type | Object height in Millimeters |
| Maximum Field | 176.78 |
| Primary Wave | 0.460000 |
| Lens Units | Millimeters |
| Angular Mag. | 0.733108 |

Field Type: Object height in Millimeters

| # | X-Value | Y-Value | Weight |
|---|---|---|---|
| 1 | 0.000000 | 0.000000 | 1.000000 |
| 2 | 0.000000 | 50.000000 | 1.000000 |
| 3 | 0.000000 | 125.000000 | 6.000000 |
| 4 | 0.000000 | 176.780000 | 8.000000 |

| Surf | Type | Comment | Radius | Thickness | Glass | Diameter | Conic |
|---|---|---|---|---|---|---|---|
| OBJ | STANDARD | | Infinity | 527.1354 | | 353.56 | 0 |
| 1 | STANDARD | | Infinity | 20 | | 97.86466 | 0 |
| 2 | STANDARD | | 122.2812 | 12.1 | LASFN30 | 90 | 0 |
| 3 | STANDARD | | 3522.066 | 11.54777 | | 81.64454 | 0 |
| 4 | STANDARD | | −84.52648 | 6.5 | SF4 | 80.24357 | 0 |
| 5 | STANDARD | | 153.2644 | 61.24794 | | 90 | 0 |
| 6 | STANDARD | | −155.5404 | 16 | LAK8 | 99.87114 | 0 |
| 7 | STANDARD | | −80.66975 | 80.46842 | | 110 | 0 |
| STO | STANDARD | | 220.1901 | 8.7 | PSK53A | 88 | 0 |
| 9 | STANDARD | | −942.9635 | 0.4 | | 78.30615 | 0 |
| 10 | STANDARD | | 105.8971 | 8.6 | PSK53A | 88 | 0 |
| 11 | STANDARD | | 249.1318 | 0.4 | | 78.54527 | 0 |
| 12 | STANDARD | | 66.75565 | 9.7 | LAK8 | 88 | 0 |
| 13 | STANDARD | | 93.30818 | 64.10018 | | 73.54241 | 0 |
| 14 | STANDARD | FILTER | Infinity | 2 | SILICA | 50 | 0 |
| 15 | STANDARD | | Infinity | 7 | | 50 | 0 |
| 16 | STANDARD | WINDOW | Infinity | 5 | SILICA | 50 | 0 |
| 17 | STANDARD | | Infinity | 8 | | 50 | 0 |
| IMA | STANDARD | CCD | Infinity | 0 | | 24.58 | 0 |

Figure 9:
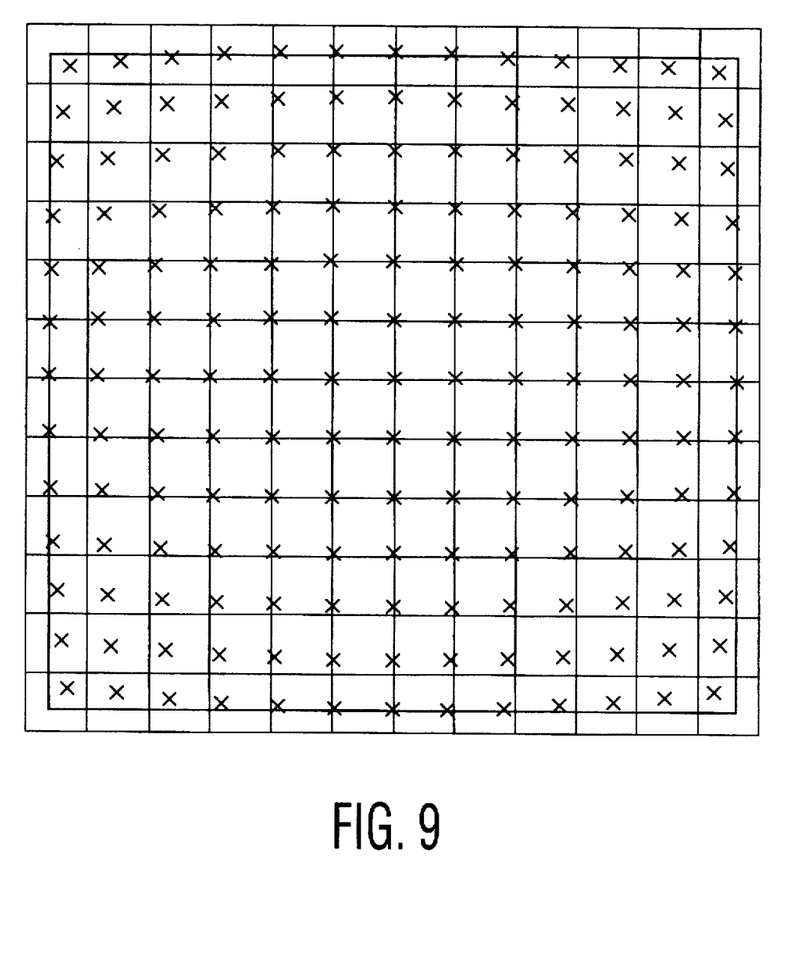
FIG. 9 is a schematic representation of grid distortion for the optical system of FIGS. 1 and 2.

FIGS. 4–8 show the RMS spot size across the entire field. The spot size is kept smaller than the pixel size (24 microns). FIG. 9 shows the relatively large (certainly visible) amount of barrel distortion. The barrel distortion appears about the edge of the field as is clear from FIG. 9. Mapping algorithms to correct barrel distortion are well known and can be used to correct barrel distortion herein.

The term high distortion is defined herein as referring to a level of distortion where it is bothersome to the human psyche. The psyche is unable to notice distortion of about two percent. But levels of about five percent or higher are considered bothersome. "high distortion" refers to distortion levels of above five percent.

What is claimed is:

1. A refractive, finite conjugate, optical system including a plurality of lenses arranged along an optical axis, said system also including a solid state imager and a substantially planar source of a light pattern at each of a plurality of wavelengths at a first end of said optical axis, said plurality of lenses transmitting light from said source to said imager, said plurality of lenses including a lens having significantly-high distortion characteristics providing high light collection efficiency at each of said plurality of wavelengths, said plurality of lenses being inoperative to focus an image of said light pattern at all wavelengths simultaneously, said system also including filter means and means for moving said filter and said solid state imager along said optical axis to a selected one of a set of specific wavelength positions for imaging light at only one specific wavelength at a time, said system also including means coupled to said imager for storing images captured thereby and means for correcting distortion in said images.

2. An optical system as in claim 1 wherein said imager is a CCD camera.

3. An optical system as in claim 2 wherein said camera is a cooled CCD camera also including a dewar window and said means for moving also moves said window.

4. An optical system as in claim 2 wherein said plurality of lenses comprises six lens elements.

5. A system as in claim 4 wherein said constitute six lens elements a high aperture, finite-conjugate, imaging lens set operative at discrete wavelengths in the range of from 390 to 595 nm.

6. A system as in claim 5 in combination with a planar electropheresis source of a light pattern at each of a set of discrete wavelengths in the range of from 390 to 595 nm.

7. A system as in claim 1 wherein said means for correcting distortion comprises software located in a controller.

8. A system as in claim 5 in combination with a planar phosphor field responsive to X-rays to emit a light pattern at each of a set of discrete wavelengths in the range of from 390 to 595 nm.

* * * * *